US010173501B2

(12) United States Patent
Noda

(10) Patent No.: US 10,173,501 B2
(45) Date of Patent: Jan. 8, 2019

(54) STANDING PILLAR SASH FOR VEHICLE DOOR, AND METHOD FOR MANUFACTURING STANDING PILLAR SASH FOR VEHICLE DOOR

(71) Applicant: SHIROKI CORPORATION, Fujisawa-Shi, Kanagawa (JP)

(72) Inventor: Atsuo Noda, Kanagawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 49 days.

(21) Appl. No.: 15/126,426

(22) PCT Filed: Apr. 7, 2015

(86) PCT No.: PCT/JP2015/060888
§ 371 (c)(1),
(2) Date: Sep. 15, 2016

(87) PCT Pub. No.: WO2015/156294
PCT Pub. Date: Oct. 15, 2015

(65) Prior Publication Data
US 2017/0080783 A1  Mar. 23, 2017

(30) Foreign Application Priority Data
Apr. 10, 2014  (JP) .................. 2014-081022

(51) Int. Cl.
*B23K 26/21* (2014.01)
*B60J 5/04* (2006.01)
(Continued)

(52) U.S. Cl.
CPC ............. *B60J 5/0402* (2013.01); *B23K 26/21* (2015.10); *B60J 5/0406* (2013.01); *B60J 10/74* (2016.02);
(Continued)

(58) Field of Classification Search
CPC .......... B60J 5/0402; B60J 10/74; B23K 26/21
See application file for complete search history.

(56) References Cited

U.S. PATENT DOCUMENTS 2,329,494 A  9/1943  Trautvetter
7,325,859 B1  2/2008  Brancaleone et al.
(Continued)

FOREIGN PATENT DOCUMENTS

CN  1955436 A  5/2007
JP  11-347669 A  12/1999
(Continued)

OTHER PUBLICATIONS

Office Action (The First Office Action) dated Feb. 1, 2018, by the State Intellectual Property Office (SIPO) of the People's Republic of China in corresponding Chinese Patent Application No. 201580014794.X and an English Translation of the Office Action. (21 pages).
(Continued)

Primary Examiner — Hilary L Gutman
(74) Attorney, Agent, or Firm — Buchanan Ingersoll & Rooney PC

(57) ABSTRACT

A vehicle door standing pillar sash includes a first member and a second member combined together, the first member comprising a glass run holding portion that has a recessed shape opened toward a window opening side, the second member comprising a bag-shaped portion that protrudes toward a vehicle inner side with respect to the glass run holding portion; a pair of opposed portions formed at a bottom part of the glass run holding portion, the pair of opposed portions including the first member and the second member, the first member and the second member being opposed to each other; and a protruding portion provided on one of the pair of opposed portions, the protruding portion protruding toward the other of the pair of opposed portions,
(Continued)

the protruding portion laminated and bonded to the other of the pair of opposed portions by welding.

8 Claims, 11 Drawing Sheets

(51) Int. Cl.
*B60J 10/74* (2016.01)
*B23K 101/00* (2006.01)

(52) U.S. Cl.
CPC ... *B23K 2101/006* (2018.08); *B60Y 2410/124* (2013.01)

(56) References Cited

U.S. PATENT DOCUMENTS

| | | | |
|---|---|---|---|
| 2006/0181107 A1* | 8/2006 | Nishikawa | B60J 5/0402 296/146.2 |
| 2014/0042772 A1 | 2/2014 | Ohsawa et al. | |
| 2014/0132028 A1* | 5/2014 | Yamada | B60J 5/0402 296/146.2 |
| 2016/0031298 A1* | 2/2016 | Yoshihara | B60J 5/0402 296/146.2 |

FOREIGN PATENT DOCUMENTS

| | | |
|---|---|---|
| JP | 2008-273343 A | 11/2008 |
| JP | 2010-052462 A | 3/2010 |
| JP | 2010-105531 A | 5/2010 |
| JP | 2010-116043 A | 5/2010 |
| JP | 2010-247771 A | 11/2010 |
| JP | 2014-34294 A | 2/2014 |
| WO | 2014/163133 A1 | 10/2014 |

OTHER PUBLICATIONS

International Search Report (PCT/ISA/210) dated Jun. 30, 2015, by the Japanese Patent Office as the International Searching Authority for International Application No. PCT/JP2015/060888.
Written Opinion (PCT/ISA/237) dated Jun. 30, 2015, by the Japanese Patent Office as the International Searching Authority for International Application No. PCT/JP2015/060888.
Office Action (Decision to Grant a Patent) dated Sep. 18, 2018, by the Japanese Patent Office in corresponding Japanese Patent Application No. 2014-081022 and an English Translation of the Office Action. (6 pages).

* cited by examiner

STANDING PILLAR SASH FOR VEHICLE DOOR, AND METHOD FOR MANUFACTURING STANDING PILLAR SASH FOR VEHICLE DOOR

CROSS-REFERENCE TO RELATED APPLICATIONS

This application is national stage application of International Application No. PCT/JP2015/060888, filed Apr. 7, 2015, which designates the United States, incorporated herein by reference, and which claims the benefit of priority from Japanese Patent Application No. 2014-081022, filed Apr. 10, 2014, the entire contents of which are incorporated herein by reference.

FIELD

The present invention relates to a standing pillar sash for a vehicle door and a method for manufacturing the standing pillar sash for the vehicle door.

BACKGROUND

A door sash (door frame), which forms a window frame in a vehicle door, is constituted as an elongated member having a certain cross-sectional shape obtained by roll forming or press forming of a metal material. In general, the door sash includes a design portion located on the vehicle outer side, a hollow portion that protrudes toward the vehicle inner side with respect to the design portion, and a connection portion that connects the design portion and the hollow portion to each other. A glass run insertion portion for inserting a glass run, which is an elastic member configured to hold an edge portion of door glass, thereinto is formed in a region surrounded by the design portion, the hollow portion, and the connection portion. A standing pillar sash, which is one member constituting the door sash and protrudes upward from a door panel, may be constituted by combining two or more elongated members in terms of the fact that the width of the design portion or the cross-sectional shape of the hollow portion needs to gradually change (Patent Document 1: Japanese Patent Application Laid-open No. 2010-105531). For example, there has been known a standing pillar sash constituted by combining a first member having a channel-shaped cross-section surrounding the glass run insertion portion and a second member that forms a protruding portion of the hollow portion protruding to the vehicle inner side. This configuration enables the cross-sectional shape of each portion in the second member to gradually change relatively easily by forming the first member to have a substantially uniform cross-sectional shape by roll forming of a metal plate and forming the second member as a metal plate pressed component.

For forming a standing pillar sash by combining the two members as described above, the first member and the second member are laminated at the connection portion and bonded together by spot welding. The first member and the second member are each an elongated member, and hence precision control thereof is difficult. It can therefore be difficult to precisely laminate the first member and the second member at the connection portion with high precision and reliably bond the first member and the second member together by welding.

The present invention has been made in view of the problem described above, and it is an object thereof to provide a standing pillar sash for a vehicle door that is capable of bonding two members together by precisely combining laminated parts thereof, and a manufacturing method contributing to an improvement in productivity of the standing pillar sash.

The present invention provides a vehicle door standing pillar sash comprises a first member and a second member combined together, the first member comprising a glass run holding portion that has a recessed shape opened toward a window opening side, the second member comprising a bag-shaped portion that protrudes toward a vehicle inner side with respect to the glass run holding portion; a pair of opposed portions formed at a bottom part of the glass run holding portion, the pair of opposed portions including the first member and the second member, the first member and the second member being opposed to each other; and a protruding portion provided on one of the pair of opposed portions, the protruding portion protruding toward the other of the pair of opposed portions, the protruding portion laminated and bonded to the other of the pair of opposed portions by welding.

The protruding portions are preferably formed in a plurality of regions the positions of which are different from one another in a longitudinal direction of the standing pillar sash.

It is preferred that the protruding portion formed at the bottom part of the glass run holding portion and the other of the pair of opposed portions be laminated on each other along a direction connecting the vehicle inner side and a vehicle outer side and be bonded together, and at a position facing the window opening, an edge portion of the glass run holding portion of the first member and an edge portion of the bag-shaped portion of the second member be laminated on each other along the direction connecting the vehicle inner side and the vehicle outer side and be bonded together by welding.

In the standing pillar sash, in the case where the protruding portion and the other of the pair of opposed portions are bonded together by laser welding, the protruding portion is preferably provided to the first member as a shape that is not brought into contact with a glass run inserted in the glass run holding portion. Furthermore, in the case of a configuration in which a weather strip is supported on a rear side of the glass run holding portion, the protruding portion is preferably provided to the second member as a shape that is not brought into contact with the weather strip. These configurations can reduce the fear in that a burr created by laser welding may interfere with the glass run or the weather strip.

As a detailed configuration of the first member, it is preferred that the first member include a first design portion located on the vehicle outer side, a vehicle inner-side portion located on the vehicle inner side, and a first connection portion connecting the first design portion and the vehicle inner-side portion to each other, and that the glass run holding portion be a portion surrounded by the first design portion, the vehicle inner-side portion, and the first connection portion. It is preferred that the second member be configured such that a second design portion located on the vehicle outer side with respect to the bag-shaped portion and the bag-shaped portion be connected to each other via the second connection portion. Of these portions, the first connection portion and the second connection portion constitute a pair of opposed portions formed at the bottom part of the glass run holding portion.

The present invention relates also to a method for manufacturing the standing pillar sash having the configuration described above. First, the manufacturing method includes irradiating a bonded portion at which the protruding portion and the other of the pair of opposed portions with laser light from the window opening side to bond the first member and the second member to each other by fusion.

In addition, a bonded portion at which an edge portion of the glass run holding portion and an edge portion of the bag-shaped portion are preferably laminated on each other be irradiated with laser light from the window opening side to bond the first member and the second member together by fusion. Consequently, the two bonded portions can be welded through irradiation of laser light from the same direction, and the work efficiency can be remarkably improved.

The edge portion of the glass run holding portion and the edge portion of the bag-shaped portion are preferably irradiated with laser light continuously along a linear region along the longitudinal direction of the standing pillar sash.

One of the first member and the second member on the side where the protruding portion is preferably provided be formed by roll forming of a metal material, and the protruding portion is preferably formed by press forming.

The vehicle door standing pillar sash according to the present invention described above facilitates precise control of the first member and the second member by bonding the first member and the second member together by welding at the protruding portion provided at the opposed portion of the first member and the second member at the bottom part of the glass run holding portion, and enables the first member and the second member to be precisely and reliably bonded together.

Furthermore, as the method for manufacturing a standing pillar sash, the bonding of the first member and the second member at the bottom part of the glass run holding portion is achieved by laser welding involving applying laser light from the window opening side, and the bonding of the first member and the second member at the edge portion of the glass run holding portion and the edge portion of the bag-shaped portion is also achieved by similar laser welding from the window opening side. Consequently, production efficiency can be improved.

Referring to the accompanying drawings, one embodiment of the present invention is now described. In the embodiment, the present invention is applied to a standing pillar sash 27 of a door sash 14 constituting an automobile front seat door 10 (hereinafter referred to as "door 10") illustrated in FIG. 1 and the manufacture of the standing pillar sash 27. The door 10 is a front seat side door on the right side (the right side when looking ahead from a driver's seat). In the following description, the side of the door sash 14 facing a window opening 16 is referred to as "inner peripheral side", and the opposite side facing a vehicle body opening portion is referred to as "outer peripheral side". Furthermore, the expressions of directions, such as front, rear, upper, lower, vehicle inner side, and vehicle outer side, mean the directions based on the body of an automobile to which the door 10 is mounted.

Figure 1:
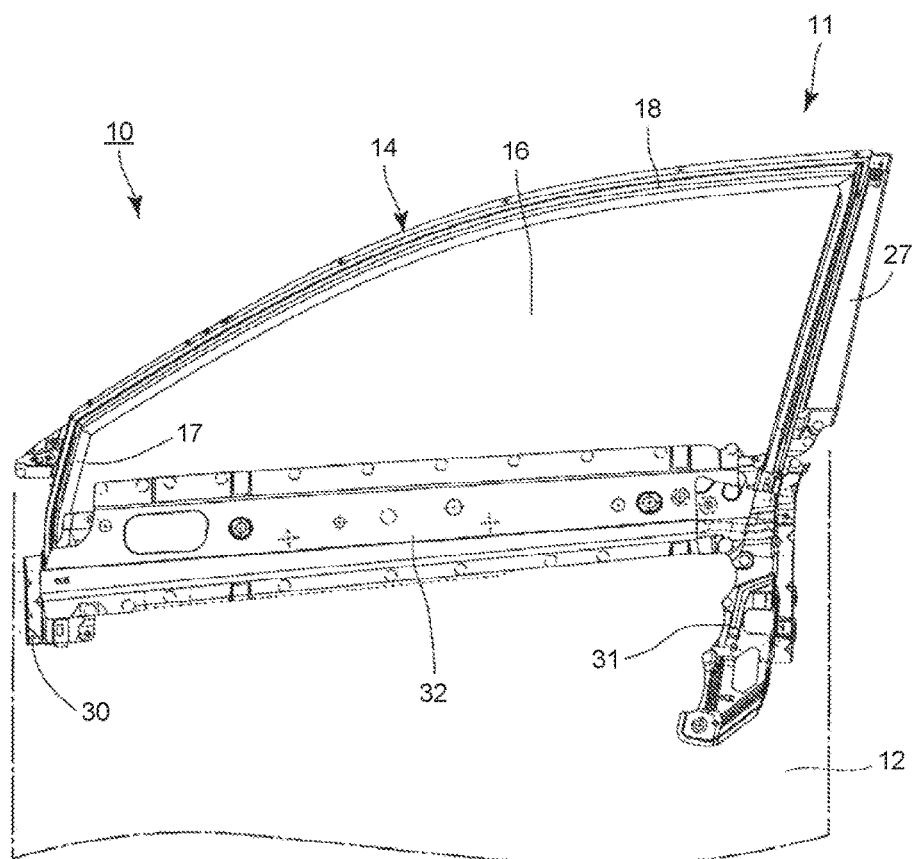
FIG. 1 is a side view of a front seat door of a vehicle including a standing pillar sash to which the present invention is applied, as viewed from the vehicle inner side.

The door 10 includes a metal door frame assembly 11 indicated by the solid line in FIG. 1 and a metal door panel 12 the schematic shape of which is indicated by the virtual line in FIG. 1. The door frame assembly 11 includes the door sash 14 that is formed into a frame shape above the door panel 12, a hinge bracket 30 and a lock bracket 31 that are connected to a lower portion of the door sash 14, and an elongated belt reinforcement 32 that is connected to the hinge bracket 30 and the lock bracket 31 and provided to extend in the anterior-posterior direction. Door glass (not illustrated) is raised and lowered in the window opening 16 surrounded by an upper edge portion of the door panel 12 (upper edge portion of the belt reinforcement 32) and an inner edge portion of the door sash 14.

Figure 5:
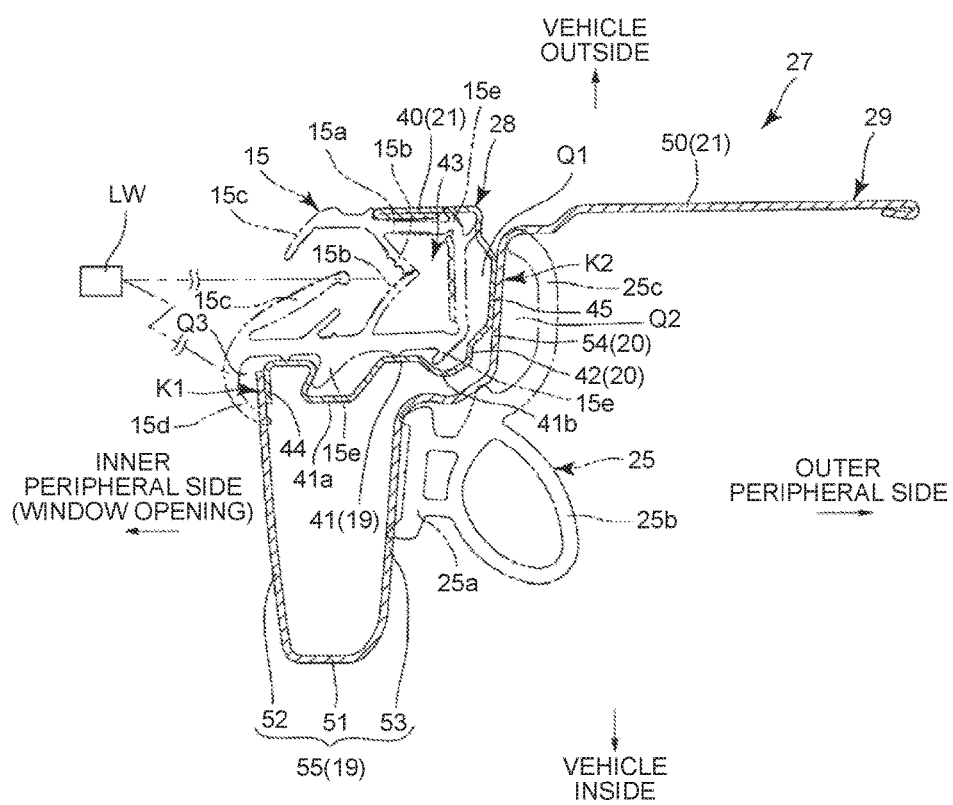
FIG. 5 is a cross-sectional view taken along the arrows V-V in FIG. 2.

A glass run 15 (FIG. 5) made of an elastic material is provided to an inner peripheral portion of the door sash 14 facing the window opening 16, and an edge portion of the door glass is held by the glass run 15. More specifically, the glass run 15 includes a frame portion 15a having a U-shape cross-section, a pair of first lips 15b provided at an intermediate part in the frame portion 15a, and a pair of second lips 15c provided at inner peripheral-side end portions of the frame portion 15a. When the door glass enters between the paired first lips 15b and the paired second lips 15c, each of the lips is elastically deformed to hold the door glass elastically. Furthermore, a cover portion 15d that protrudes from a base end portion of the vehicle inner-side second lip 15c toward the vehicle inner side is formed to the glass run 15. The cover portion 15d is an elastically deformable cantilever protruding portion the base end portion of which is connected to the frame portion 15a and the distal end of which is a free end portion. The cover portion 15d has a curved (arched) shape that is convex toward the inner peripheral side of the door sash 14. The first lips 15b, the second lips 15c, and the cover portion 15d in FIG. 5 are illustrated as the shapes in the free state before elastic deformation. A plurality of support protruding portions 15e are formed on an outer surface of the frame portion 15a of the glass run 15 so as to protrude therefrom.

A weather strip 25 (FIG. 5) made of an elastic material is supported to an outer peripheral portion of the door sash 14. The weather strip 25 includes a leg portion 25a, a hollow contact portion 25b that protrudes from the leg portion 25a toward the outer peripheral side, and an extended cover portion 25c provided to extend from a boundary part between the leg portion 25a and the hollow contact portion 25b toward the vehicle outer side. The hollow contact portion 25b has a tube shape with a hollow inside, and is elastically deformable. The extended cover portion 25c is an elastically deformable cantilever protruding portion the distal end of which is a free end portion. The extended cover portion 25c has a curved (arched) shape that is convex toward the outer peripheral side of the door sash 14. The hollow contact portion 25b and the extended cover portion 25c in FIG. 5 are illustrated as the shapes in the free state before elastic deformation.

The door sash 14 includes a front sash 17 constituting a front edge portion of the door sash 14, an upper sash 18 forming a door upper edge portion, and a standing pillar sash 27 provided to extend upward from a rear portion of the door panel 12. An upper end portion of the front sash 17 and a front end portion of the upper sash 18 are welded together, and a rear end portion of the upper sash 18 and an upper end portion of the standing pillar sash 27 are welded together at a door corner portion. When the door 10 is closed to the vehicle body (not illustrated), the upper sash 18 is located along a door opening portion of a roof panel of the vehicle body, and the hollow contact portion 25b of the weather strip 25 is elastically deformed to be brought into contact with an inner peripheral surface of the door opening portion.

The door panel 12 includes an inner panel located on the vehicle inner side and an outer panel located on the vehicle outer side. Lower parts of the front sash 17 and the standing pillar sash 27 are inserted between the inner panel and the outer panel. The hinge bracket 30 is fixed to a part of the front sash 17 that is inserted into the door panel 12, and the lock bracket 31 is fixed to a part of the standing pillar sash 27 that is inserted into the door panel 12, so that front and rear end portions of the belt reinforcement 32 are fixed to the hinge bracket 30 and the lock bracket 31, respectively. Note that the belt reinforcement 32 is constituted as an assembly formed by combining a plurality of members, and a sub bracket of the belt reinforcement 32, which is formed separately from the main body portion elongated in the anterior-posterior direction, is fixed to the lock bracket 31.

Figure 2:
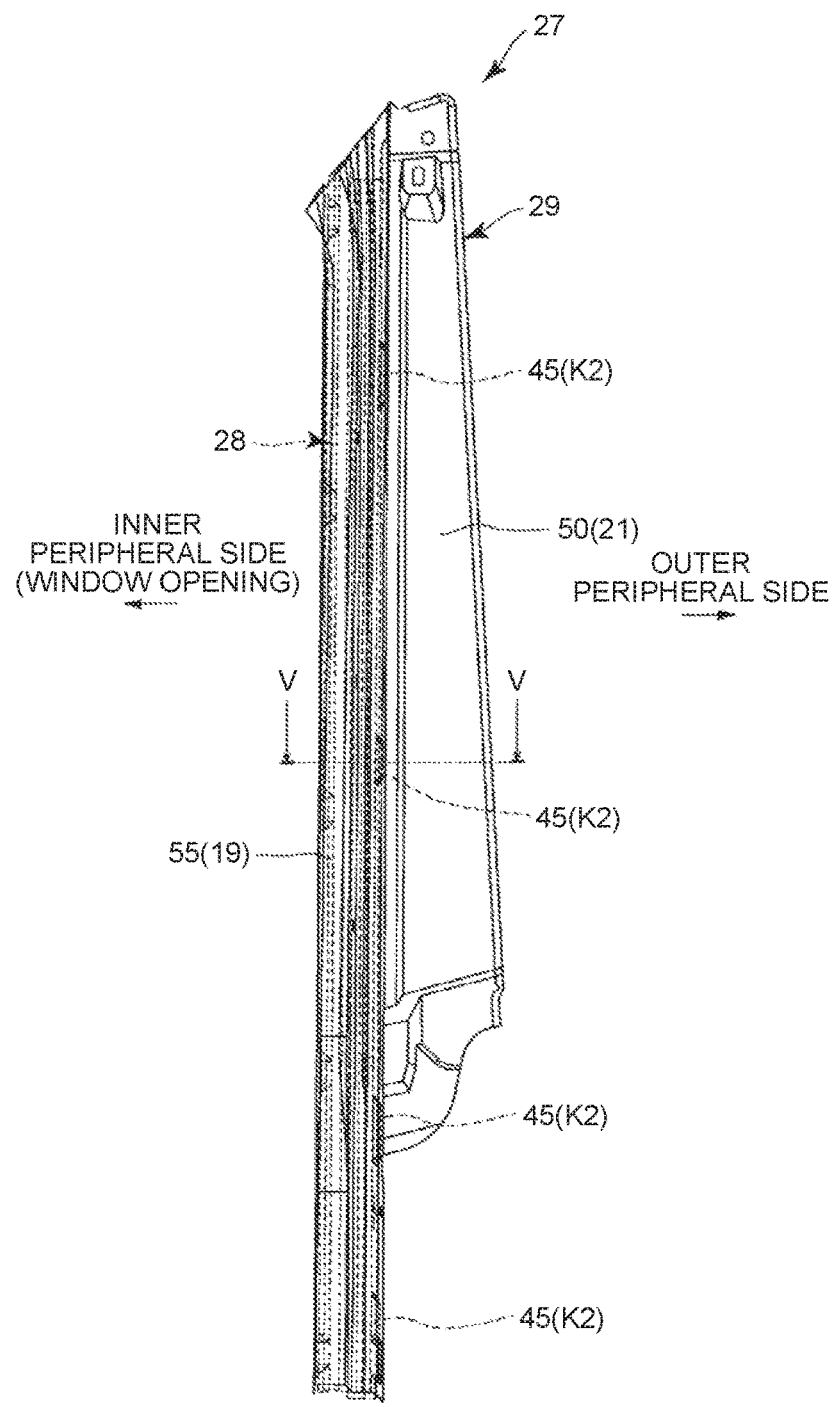
FIG. 2 is a view of the standing pillar sash as viewed from the vehicle inner side.
Figure 3:
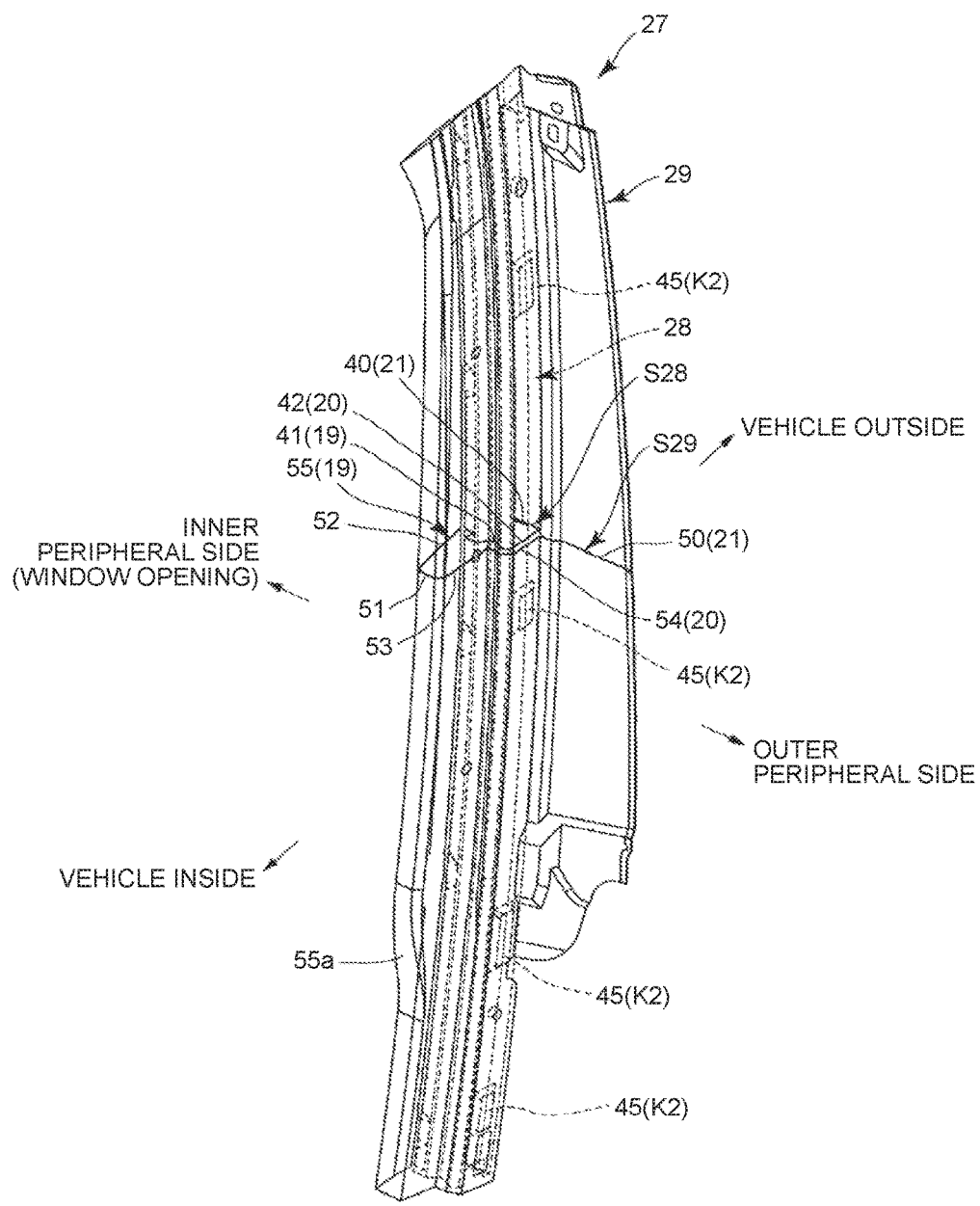
FIG. 3 is a perspective view of the standing pillar sash as viewed from the vehicle inner side.
Figure 4:
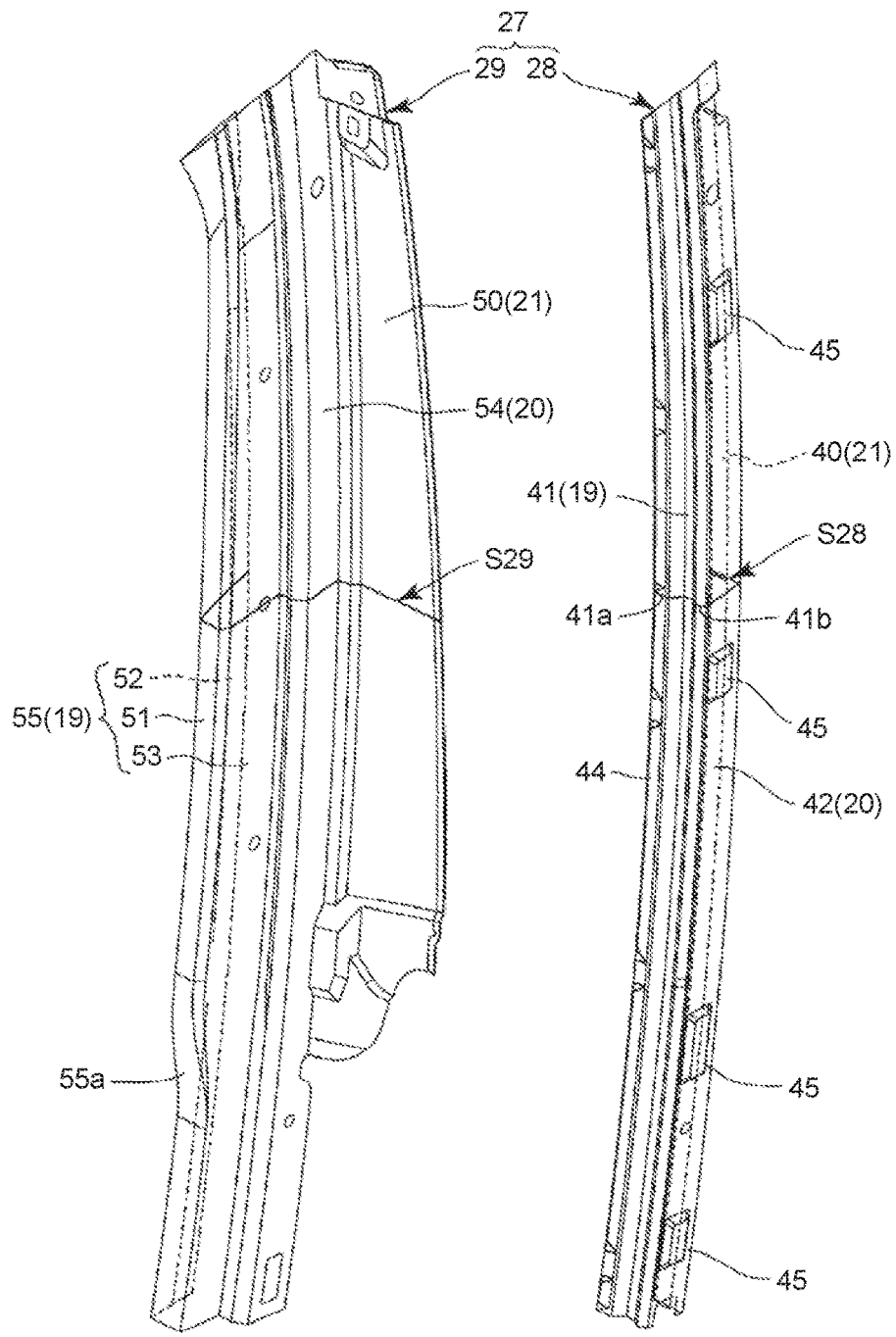
FIG. 4 is a perspective view of an outer member and an inner member constructing the standing pillar sash in an exploded state.

FIG. 2 and FIG. 3 illustrate the standing pillar sash 27 alone. As illustrated in FIG. 4, the standing pillar sash 27 is formed by combining an outer member (first member) 28 and an inner member (second member) 29. The outer member 28 is formed as an elongated member illustrated in FIG. 4 by roll forming of a plate-shaped iron-based material (for example, SUS) while the material is conveyed in a certain direction with a conveying device (not illustrated). The inner member 29 is formed as an elongated member illustrated in FIG. 4 by press forming of the same material as that of the outer member 28.

The outer member 28 and the inner member 29 are bonded together by laser welding described later. FIG. 5 illustrates a cross-section of the standing pillar sash 27 passing through the bonded region of the outer member 28 and the inner member 29. In FIG. 3 and FIG. 4, the cross-sectional shapes of the outer member 28 and the inner member 29 at a general cross-sectional part of the standing pillar sash 27 other than the bonded region are illustrated as virtual cross-sections S28 and S29, respectively.

As illustrated in FIG. 5, the outer member 28 includes a vehicle outer-side portion (first design portion) 40 located on the vehicle outer side, a vehicle inner-side portion 41 located on the vehicle inner side so as to be opposed to the vehicle outer-side portion 40, and an inner peripheral connection portion (first connection portion) 42 that connects the vehicle outer-side portion 40 and the vehicle inner-side portion 41 to each other. The outer member 28 forms a glass run holding portion 43 surrounded by these portions. The glass run holding portion 43 is a recess opened toward the inner peripheral side, and the glass run 15 is inserted inside the glass run holding portion 43. An inner peripheral-side end portion of the vehicle outer-side portion 40 is subjected to hemming processing so as to be folded toward the vehicle inner side. When the glass run 15 is attached to the glass run holding portion 43 after the door sash 14 is completed, the support protrusion 15e of the glass run 15 is engaged with the hemming-processed portion and retained (FIG. 5). Furthermore, engagement recesses 41a and 41b that are shaped to protrude toward the vehicle inner side are formed in the vehicle inner-side portion 41, and the support protrusions 15e of the glass run 15 are engaged with the engagement recesses 41a and 41b and retained (FIG. 5). In addition, a folded portion 44 that is bent at substantially right angles toward the vehicle inner side is formed at an inner peripheral-side end portion of the vehicle inner-side portion 41. Protruding portions 45 that protrude toward the outer peripheral side are formed on an inner peripheral connection portion 42. As illustrated in FIG. 5, in the state in which the glass run 15 is attached, a clearance space Q1 is formed between a bottom part of the frame portion 15a of the glass run 15 and the protruding portion 45 due to the offset shape of the protruding portion 45 with respect to the inner peripheral connection portion 42. The protruding portions 45 are provided at certain intervals in a plurality of regions (four regions in the embodiment) the positions of which are different from one another in the longitudinal direction of the standing pillar sash 27. As described above, the outer member 28 is formed by roll forming of a plate-shaped metal material. The cross-sectional shape of the outer member 28 is different only in the regions where the protruding portions 45 are formed, and hence the protruding portions 45 may be formed by press forming after the basis shape (general cross-sectional shape) of the outer member 28 is formed by roll forming.

As illustrated in FIG. 5, the inner member 29 includes a vehicle outer-side portion (second design portion) 50 located on the vehicle outer side, a vehicle inner-side portion 51 located on the inner peripheral side with respect to the vehicle outer-side portion 50 and located on the vehicle inner side, an inner peripheral portion 52 that protrudes from an inner peripheral-side edge portion of the vehicle inner-side portion 51 toward the vehicle outer side, an outer peripheral portion 53 that protrudes from an outer peripheral-side edge portion of the vehicle inner-side portion 51 toward the vehicle outer side, and an outer peripheral connection portion (second connection portion) 54 that connects the outer peripheral portion 53 and the vehicle outer-side portion 50 to each other. The vehicle inner-side portion 51, the inner peripheral portion 52, and the outer peripheral portion 53 form a bag-shaped portion 55 shaped to protrude toward the vehicle inner side. An outer peripheral-side end portion of the vehicle outer-side portion 50 is subjected to hemming processing so as to be folded toward the vehicle inner side. As illustrated in FIG. 3 and FIG. 4, the bag-shaped portion 55 has a smaller protruding amount toward the vehicle inner side at an inserted part inserted into the door panel 12 than at an exterior part protruding from the door panel 12, and includes a gradually changing portion 55a having a cross-sectional shape gradually changing from the exterior part to the inserted part.

As illustrated in FIG. 5, when the weather strip 25 is attached after the door sash 14 is completed, the leg portion 25a is supported on the outer peripheral portion 53 of the inner member 29. Although not illustrated, a holding member configured to hold the leg portion 25a is separately fixed to the inner member 29. The extended cover portion 25c of the weather strip 25 covers the outer peripheral side of the outer peripheral connection portion 54 of the inner member 29, and a distal end portion of the extended cover portion 25c, which is a free end, is brought into contact with the vicinity of a boundary between the outer peripheral connection portion 54 and the vehicle outer-side portion 50. As understood from FIG. 5, in the state in which the weather strip 25 is attached, the extended cover portion 25c having a curved shape that is convex toward the outer peripheral side is separated away from the outer peripheral connection portion 54 to form a clearance space Q2.

The standing pillar sash 27 constituted by combining the outer member 28 and the inner member 29 described above is roughly divided into a hollow portion 19 located on the vehicle inner side, a connection portion 20 extending from the hollow portion 19 toward the vehicle outer side, and a design portion 21 located on the vehicle outer side.

The hollow portion 19 has a closed cross-sectional shape obtained by closing the vehicle outer side of the bag-shaped portion 55 of the inner member 29 with the vehicle inner-side portion 41 of the glass run holding portion 43 of the outer member 28. Specifically, the vehicle inner-side portion 41 and the bag-shaped portion 55 constitute the hollow portion 19. As illustrated in FIG. 5, the outer member 28 and the inner member 29 are laminated on each other at the hollow portion 19 on the inner peripheral side facing the window opening 16, thereby constituting a first bonded portion K1. More specifically, the folded portion 44 provided at an inner peripheral-side edge portion of the glass run holding portion 43 of the outer member 28 and a vehicle outer-side edge portion of the inner peripheral portion 52 of the bag-shaped portion 55 of the inner member 29 are laminated on each other along a direction connecting the vehicle inner side and the vehicle outer side, thereby forming the first bonded portion K1.

As illustrated in FIG. 5, when the glass run 15 is attached to the door sash 14, the cover portion 15d of the glass run 15 protrudes from the glass run holding portion 43 to cover the inner peripheral side of the first bonded portion K1. The cover portion 15d having a curved shape that is convex toward the inner peripheral side is separated away from the first bonded portion K1 to form a clearance space Q3.

The connection portion 20 is constituted by the inner peripheral connection portion 42 of the outer member 28 and the outer peripheral connection portion 54 of the inner member 29. In the general cross-sectional parts (S28, S29) of the outer member 28 and the inner member 29 illustrated in FIG. 3, the inner peripheral connection portion 42 and the outer peripheral connection portion 54 are separated away from each other, and the protruding portion 45 that protrudes from the inner peripheral connection portion 42 of the connection portion 20 abuts on the outer peripheral connection portion 54 to constitute a second bonded portion K2. At the second bonded portion K2, the protruding portion 45 and the outer peripheral connection portion 54 are laminated on each other along the direction connecting the vehicle inner side and the vehicle outer side.

Note that the direction connecting the vehicle inner side and the vehicle outer side at the first bonded portion K1 or the second bonded portion K2 means that the laminated metal plates are arranged to be oriented substantially from the vehicle inner side to the vehicle outer side (or from the vehicle outer side to the vehicle inner side), and includes a configuration having a slight inclination component to the inner peripheral side or the outer peripheral side. For example, at the first bonded portion K1, the folded portion 44 and the inner peripheral portion 52 are each inclined to gradually protrude toward the inner peripheral side of the standing pillar sash 27 as approaching the vehicle outer side from the vehicle inner side. Furthermore, at the second bonded portion K2, the protruding portion 45 and the outer peripheral connection portion 54 are each inclined to gradually protrude toward the outer peripheral side of the standing pillar sash 27 as approaching the vehicle outer side from the vehicle inner side. In other words, the laminated metal plates are required to have a positional relation so as to be bonded by fusion through irradiation of laser light from the inner peripheral side of the standing pillar sash 27 at a laser welding step described later.

The design portion 21 is constituted by a vehicle outer-side portion 40 of the outer member 28 and a vehicle outer-side portion 50 of the inner member 29. As illustrated in FIG. 2 to FIG. 4, a part of the design portion 21 corresponding to the exterior of the standing pillar sash 27 has a width that becomes larger from an upper part to a lower part, and a part of the design portion 21 to be inserted into the door panel 12 is mostly cut. The width gradually changing shape of the design portion 21 can be obtained by forming the vehicle outer-side portion 50 of the inner member 29 with the maximum width and then cutting the vehicle outer-side portion 50.

In a process of manufacturing the standing pillar sash 27, the outer member 28 and the inner member 29 prepared as separate members are bonded together by laser welding in a state of being combined as illustrated in FIG. 2, FIG. 3, and FIG. 5. The regions where the outer member 28 and the inner member 29 are fixed to each other by laser welding are the first bonded portion K1 (laminated parts of folded portion 44 and inner peripheral portion 52 in the hollow portion 19) and the second bonded portion K2 (laminated parts of the protruding portion 45 and the outer peripheral connection portion 54 in the connection portion 20 (bottom part of the glass run holding portion 43)). Each of the first bonded portion K1 and the second bonded portion K2 has a structure in which two metal plates are laminated on each other along the direction connecting the vehicle inner side and the vehicle outer side. Furthermore, the first bonded portion K1 is located on the vehicle inner side with respect to the glass run holding portion 43, and the second bonded portion K2 is located at the bottom part of the glass run holding portion 43. The position of the first bonded portion K1 and the position of the second bonded portion K2 are shifted from each other in the direction connecting the vehicle inner side and the vehicle outer side. Thus, in the state in which the outer member 28 and the inner member 29 are assembled to each other, both the first bonded portion K1 and the second bonded portion K2 are arranged so as to face the inner peripheral side of the standing pillar sash 27 (so as to be viewable from the window opening 16 side).

In the state in which the outer member 28 and the inner member 29 are set with the positional relation described above, as illustrated in FIG. 5, laser light is applied to the first bonded portion K1 and the second bonded portion K2 from a laser light exit portion LW (torch) placed on the inner peripheral side (window opening 16 side) of the standing pillar sash 27, thereby performing laser welding. Both of the first bonded portion K1 and the second bonded portion K2 are located at positions that can be irradiated with laser light from the inner peripheral side of the standing pillar sash 27, and hence the first bonded portion K1 and the second bonded portion K2 can be collectively laser-welded at a common welding step. A laser welding device may employ either a configuration in which a swinging common laser light exit portion LW is used to weld both the first bonded portion K1 and the second bonded portion K2 or a configuration including two laser light exit portions LW corresponding to the first bonded portion K1 and the second bonded portion K2.

Figure 6:
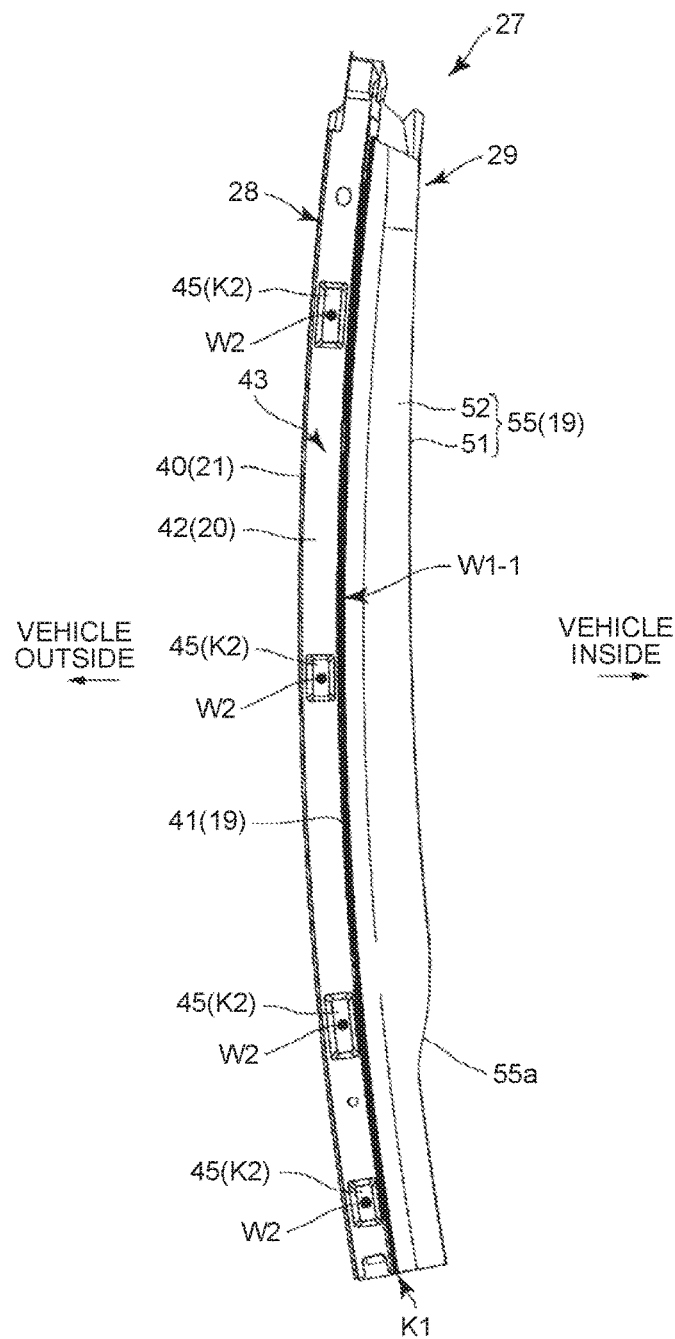
FIG. 6 is a view of the standing pillar sash as viewed from the inner peripheral side, illustrating a first mode of laser welding of the outer member and the inner member.
Figure 7:
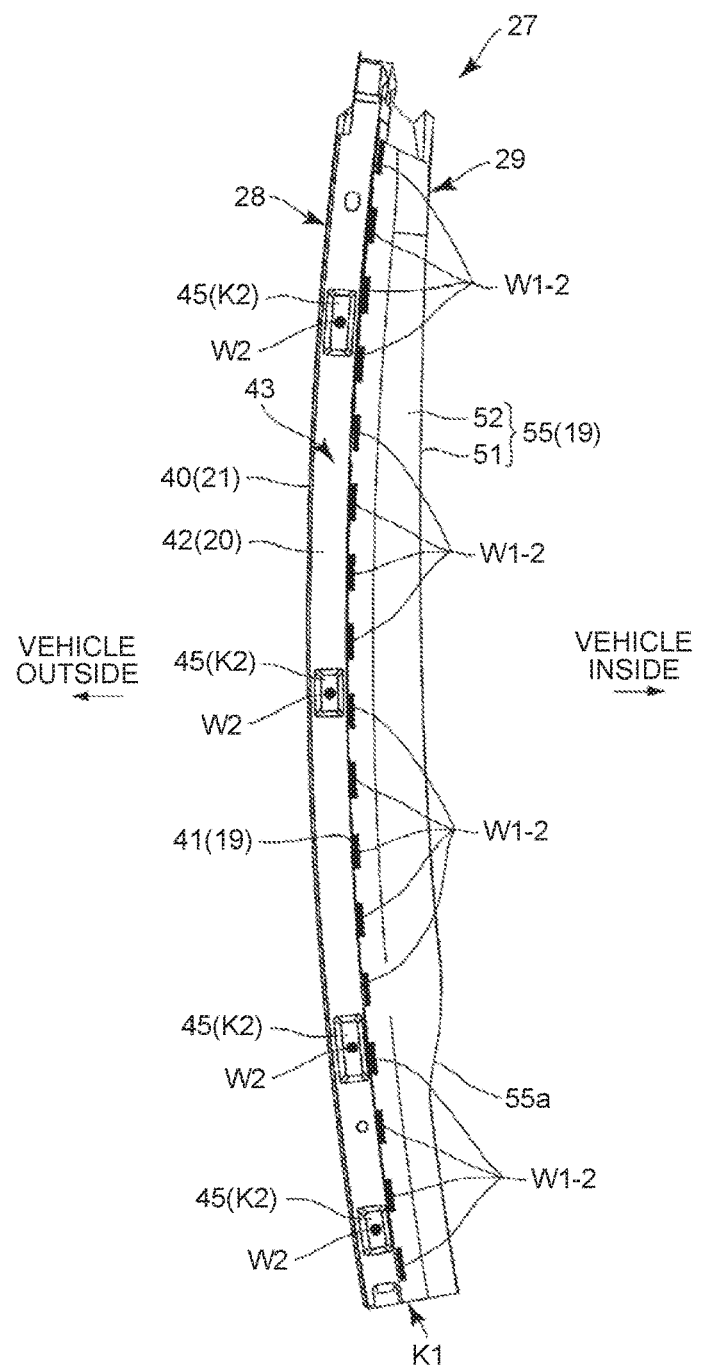
FIG. 7 is a view of the standing pillar sash as viewed from the inner peripheral side, illustrating a second mode of laser welding of the outer member and the inner member.
Figure 8:
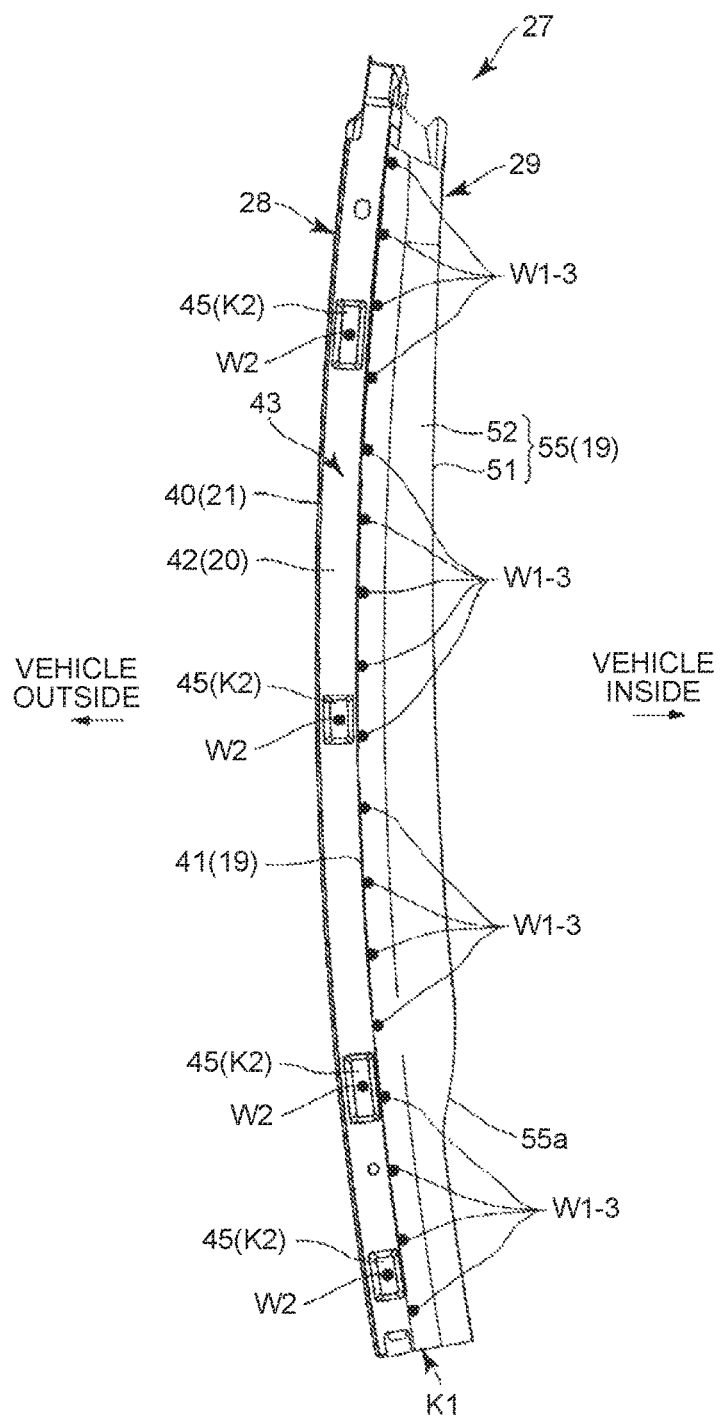
FIG. 8 is a view of the standing pillar sash as viewed from the inner peripheral side, illustrating a third mode of laser welding of the outer member and the inner member.

Three modes of laser welding at each of the bonded portions K1 and K2 are illustrated in FIG. 6 to FIG. 8. In any mode, the protruding portions 45 to be welded are present at certain intervals in the longitudinal direction of the standing pillar sash 27 as the second bonded portions K2, and accordingly the regions where the metal plates are fusion-bonded by laser welding correspond to a plurality of welded regions W2 that are present at certain intervals in the longitudinal direction of the standing pillar sash 27. FIG. 6 to FIG. 8 illustrate welding examples of forming a substantially circular (spot-like) welded region W2 at a substantially central position of the protruding portion 45.

At the first bonded portion K1, the folded portion 44 and the inner peripheral portion 52 to be welded together are continuously laminated on each other in the longitudinal direction of the standing pillar sash 27, and hence there is a degree of freedom of setting of a fusion-boning region of the metal plates in the longitudinal direction of the standing pillar sash 27. FIG. 6 is an example in which a linear welded region W1-1 is continuously formed along the longitudinal direction of the standing pillar sash 27 by laser welding. FIG. 7 and FIG. 8 are examples in which a plurality of welded regions W1-2 and W1-3 are discontinuously (at certain intervals) formed along the longitudinal direction of the standing pillar sash 27 by laser welding, respectively. The welded region W1-2 in FIG. 7 is a linear region that has some length in the longitudinal direction of the standing pillar sash 27, and the welded region W1-3 in FIG. 8 is a circular (spot-like) region similar to the welded region W2.

In any of the modes in FIG. 6 to FIG. 8, laser welding is performed by spiral welding in which the laser light exit portion LW is operated to swing so as to enlarge a spiral fusion region, thereby achieving rigid fixation in each welded region. In the case of welding the linear regions such as the welded regions W1-1 in FIG. 6 and the welded regions W1-2 in FIG. 7, spiral welding can be continuously performed to form the linear welded regions. On the premise that sufficient bonding strength is obtained, laser light can be applied with a simple linear trajectory including no rotational operation, which improves the productivity.

As described above, with the method for manufacturing the standing pillar sash 27 in the present embodiment, the bonded portions K1 and K2 of the outer member 28 and the inner member 29 are laser-welded at a series of work steps by laser light irradiation from one direction (window opening 16 side). Consequently, production efficiency of the standing pillar sash 27 can be remarkably improved as compared with a manufacturing method involving bonding each of the bonded portions K1 and K2 at separate steps such as arc welding and spot welding.

The first bonded portion K1 is a region covered with the cover portion 15*d* of the glass run 15 inserted in the glass run holding portion 43. Even when laser welding is performed in any of the modes in FIG. 6 to FIG. 8, welding marks in the welded regions W1-1, W1-2, and W1-3 do not appear on the exterior in the completed state of the door 10. The second bonded portion K2 is a region the inner peripheral side of which is covered with the frame portion 15*a* (bottom part of frame portion 15*a*) of the glass run 15 inserted in the glass run holding portion 43 in the completed state of the door 10 and the outer peripheral side of which is covered with the extended cover portion 25*c* of the weather strip 25 in the completed state of the door 10. Welding marks in the welded region W2 do not appear on the exterior, either.

Furthermore, even if a burr is created in a laser-welded region (a burr is liable to be created mainly on the side opposite to the laser light irradiation direction), a welding burr created at the first bonded portion K1 is less liable to damage the glass run 15 because the cover portion 15*d* of the glass run 15 has an arched shape that is not brought into contact with the first bonded portion K1 but forms the clearance space Q3. Furthermore, at the second bonded portion K2, laser welding is targeted at the protruding portion 45, which is formed by partially offsetting the inner peripheral connection portion 42 constituting the bottom part of the glass run holding portion 43 toward the outer peripheral side so that the inner peripheral connection portion 42 is not brought into contact with the frame portion 15*a* of the glass run 15 (so that the clearance space Q1 is formed), and hence there is no fear in that a burr created on the protruding portion 45 by welding comes into contact with the glass run 15 to damage the glass run 15. In addition, the extended cover portion 25*c* of the weather strip 25 has an arched shape that is not brought into contact with the outer peripheral connection portion 54 of the inner member 29 constituting the second bonded portion K2 but forms the clearance space Q2, and hence there is no fear in that a welding burr created on the outer peripheral connection portion 54 comes into contact with the weather strip 25 to damage the weather strip 25. Consequently, a finishing (deburring) step after laser welding can be omitted or simplified, which contributes to a further improvement in productivity of the standing pillar sash 27.

In the case of combining the outer member 28 and the inner member 29 together, at the second bonded portion K2, the protruding portion 45 that partly protrudes from the inner peripheral connection portion 42 is brought into abutment with the outer peripheral connection portion 54. Thus, precise control of the outer member 28 and the inner member 29 is facilitated, and the outer member 28 and the inner member 29 can be reliably brought into abutment with each other in the welding target region. For example, if there is a precision error between the outer member 28 and the inner member 29, a gap that is larger than a minimum clearance set on design may be generated between the inner peripheral connection portion 42 and the outer peripheral connection portion 54. In the case of the configuration in which the entire inner peripheral connection portion 42 is brought into abutment with the outer peripheral connection portion 54 unlike the configuration in the present embodiment (configuration without protruding portion 45), the region where the gap is generated cannot be controlled and hence the outer member 28 and the inner member 29 may be welded together in the gap-generated region as a target. In this case, there is a fear in that a welding defect may occur. In order to prevent a welding defect, it is necessary to take countermeasures such as clamping a welding target region of the inner peripheral connection portion 42 and the outer peripheral connection portion 54 with a force stronger than that at a general welding step. On the other hand, by providing the protruding portion 45 in a welding target region, the abutment on the outer peripheral connection portion 54 and the welding region for the outer peripheral connection portion 54 can be easily controlled, and the outer member 28 and the inner member 29 can be reliably welded together at the second bonded portion K2 without being affected by some precision errors.

On the basis of the configuration and the manufacturing method described above, as illustrated in FIG. 9 to FIG. 11, the shapes of the outer member 28 or the inner member 29 at the first bonded portion K1 or the second bonded portion K2 may be different. Note that, in FIG. 9 and FIG. 10, the shapes of the glass run 15 and the weather strip 25 are common to those in the above-described embodiment, and illustration thereof is omitted.

Figure 9:
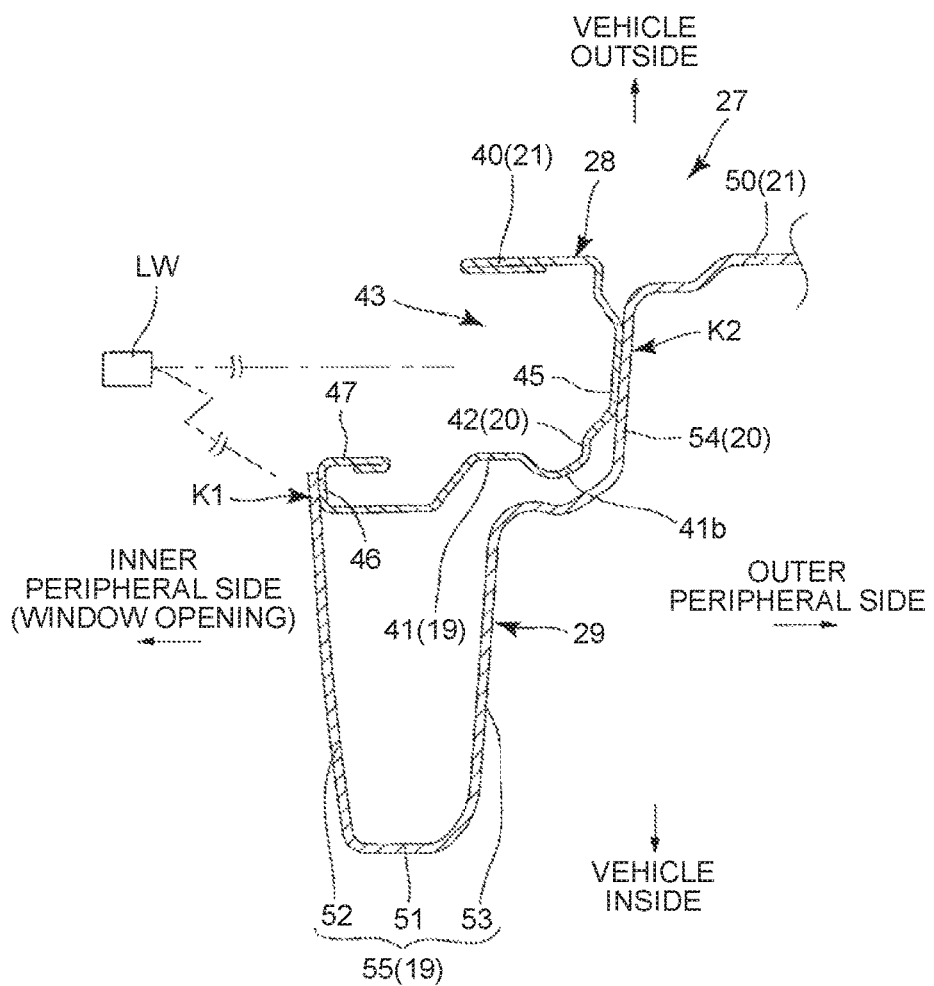
FIG. 9 is a cross-sectional view of a standing pillar sash illustrating a first modification in which the outer member and the inner member have different cross-sectional shapes.

In a first modification illustrated in FIG. 9, the shape of the outer member 28 at the first bonded portion K1 is different. At an inner peripheral-side end portion of the vehicle inner-side portion 41 of the outer member 28, the shape different from the engagement recess 41a in the above-described embodiment is set as an engagement portion for the support protrusion 15e of the glass run 15. Specifically, similarly to the engagement recess 41a, a portion that is offset to the vehicle inner side with respect to the vehicle inner-side portion 41 is extended to a position in contact with the inner peripheral portion 52 of the inner member 29, a region in contact with the inner peripheral portion 52 is bent at substantially right angles toward the vehicle inner side to form a folded portion 46, and a portion continuous to the folded portion 46 is bent at substantially right angles to the outer peripheral side (direction to bottom part of the glass run holding portion 43) to form a folded portion 47. An end portion of the folded portion 47 is subjected to hemming processing so as to be folded toward the vehicle inner side, and the support protrusion 15e (not illustrated in FIG. 9) of the glass run 15 is engaged with the hemming-processed portion. Then, a vehicle outer-side end portion of the inner peripheral portion 52 of the inner member 29 is laminated on the folded portion 46 of the outer member 28 to constitute the first bonded portion K1.

Figure 10:
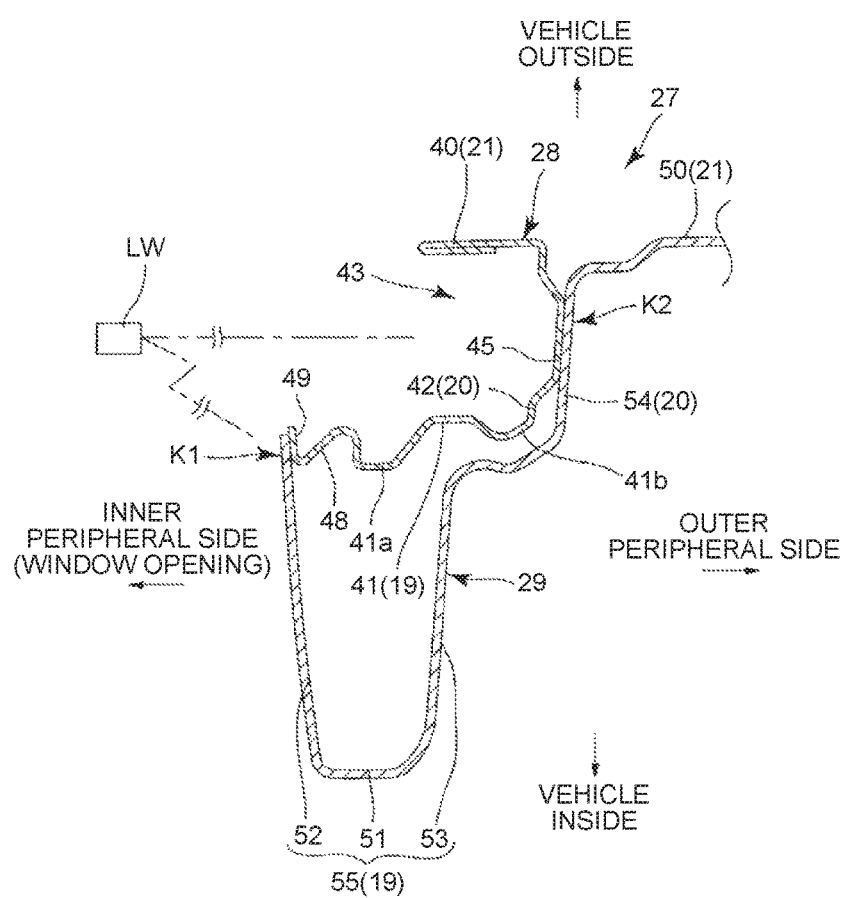
FIG. 10 is a cross-sectional view of a standing pillar sash illustrating a second modification in which the outer member and the inner member have different cross-sectional shapes.

Also in a second modification illustrated in FIG. 10, the shape of the outer member 28 at the first bonded portion K1 is different. On the vehicle inner-side portion 41 of the outer member 28, an inclined portion 48 that obliquely protrudes toward the vehicle inner side and a folded portion 49 formed by bending an end portion of the inclined portion 48 toward the vehicle outer side are formed as an inner peripheral-side end portion continuous to the engagement recess 41a. A vehicle outer-side end portion of the inner peripheral portion 52 of the inner member 29 is laminated on the folded portion 49 of the outer member 28 to constitute the first bonded portion K1.

Figure 11:
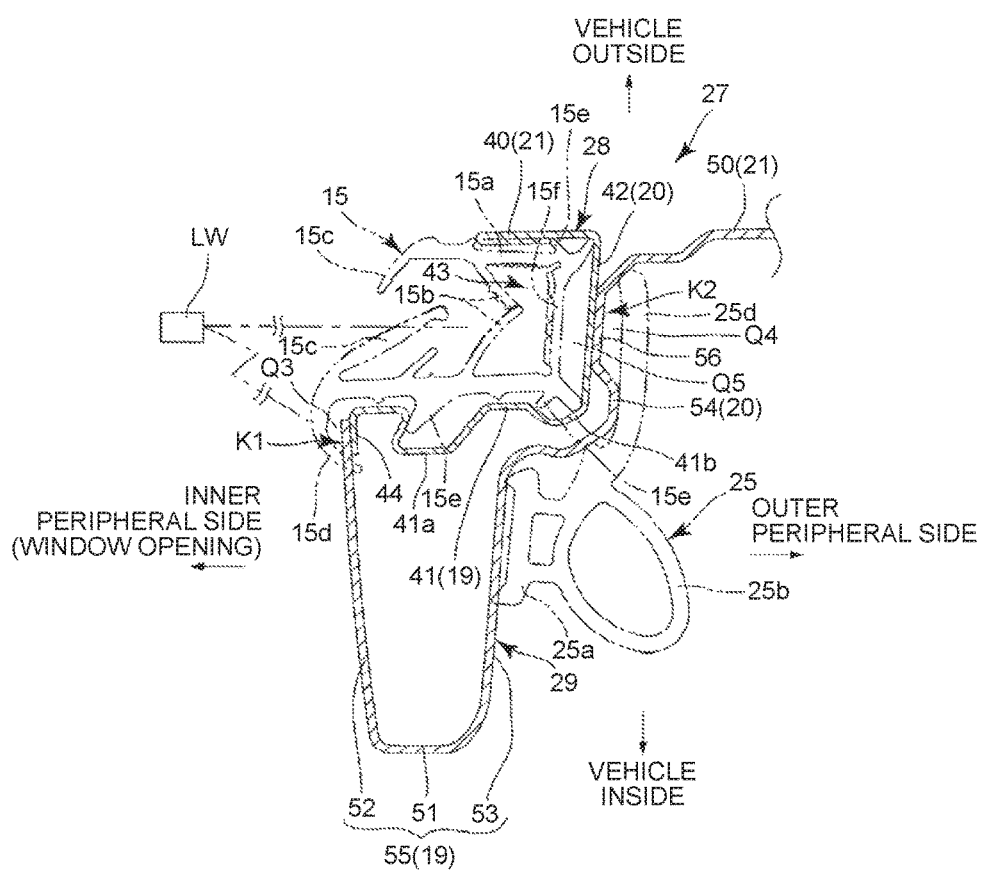
FIG. 11 is a cross-sectional view of a standing pillar sash illustrating a third modification in which the outer member and the inner member have different cross-sectional shapes.

In a third modification illustrated in FIG. 11, the shapes of the outer member 28 and the inner member 29 at the second bonded portion K2 are different. In the outer member 28, a protruding shape such as the protruding portion 45 is not formed, and the inner peripheral connection portion 42 has a flat shape. On the other hand, a protruding portion 56 that protrudes toward the inner peripheral side is formed on the outer peripheral connection portion 54 of the inner member 29, and the protruding portion 56 is brought into abutment with the inner peripheral connection portion 42 to constitute the second bonded portion K2. Similarly to the protruding portions 45 illustrated in FIG. 2 to FIG. 8, a plurality of the protruding portions 56 are formed at certain intervals at positions that differ from one another in the longitudinal direction of the standing pillar sash 27. As understood from the present modification, the protruding portion may be formed on either the inner peripheral connection portion 42 of the outer member 28 or the outer peripheral connection portion 54 of the outer member 29 in terms of precision control and welding workability at the second bonded portion K2.

In FIG. 11, the shapes of the glass run 15 and the weather strip 25 in part adjacent to the second bonded portion K2 are different from those in the above-described embodiment illustrated in FIG. 5. The weather strip 25 includes, in place of the extended cover portion 25c in FIG. 5, an extended cover portion 25d that has a shape substantially parallel to the outer peripheral connection portion 54 of the inner member 29. The protruding portion 56 constituting the second bonded portion K2 is shaped to protrude (offset) toward the inner peripheral side, and hence a clearance space Q4 can be formed between the protruding portion 56 and the flat-shaped extended cover portion 25d, thereby preventing a burr formed on the protruding portion 56 by welding from coming into contact with the weather strip 25 to damage the weather strip 25. Furthermore, an offset bottom portion 15f that is raised toward the inner peripheral side is formed on the frame portion 15a of the glass run 15 at a position facing the inner peripheral connection portion 42 of the outer member 28. When the offset bottom portion 15f is formed, a clearance space Q5 can be formed between the offset bottom portion 15f and the flat-shaped inner peripheral connection portion 42, thereby preventing a burr formed on the inner peripheral connection portion 42 by welding from coming into contact with the glass run 15 to damage the glass run 15.

In the above, the method in which two kinds of the bonded portions K1 and K2 in the outer member 28 and the inner member 29 constituting the standing pillar sash 27 are laser-welded has been described. Each portion of the door frame assembly 11 can also be laser-welded to improve the productivity of the entire door frame assembly 11. For example, bonding of the front sash 17 and the upper sash 18, bonding of the upper sash 18 and the standing pillar sash 27, bonding of the front sash 17, the hinge bracket 30, and the front end portion of the belt reinforcement 32, bonding of the standing pillar sash 27, the lock bracket 31, and the rear end portion of the belt reinforcement 32, and bonding of other such regions can be achieved by laser welding. By placing the components of the door frame assembly 11 collectively on a certain jig and sequentially laser-welding the portions described above while moving the laser light exit portion, the productivity of the entire door frame assembly 11 including the standing pillar sash 27 is significantly increased.

While the present invention has been described on the basis of the illustrated embodiments, the present invention is not limited to the illustrated embodiments, and modifications and changes can be made without departing from the gist of the invention. For example, the illustrated embodiments are applied to a standing pillar sash for a front seat side door of an automobile and a manufacturing method therefor, but the present invention is applicable also to standing pillar sashes for a rear seat door or other doors and a manufacturing method therefor.

In the standing pillar sash 27 in the illustrated embodiments, the outer member 28 is a roll formed product and the inner member 29 is a press formed product. However, the method for manufacturing each member constituting the standing pillar sash 27 is not limited thereto. For example, the inner member 29 may be a roll formed product.

As described above in detail, in the present invention, in the vehicle door standing pillar sash constituted by combining the first member including the glass run holding portion that has the recessed shape opened toward the window opening and the second member including the bag-shaped portion that protrudes toward the vehicle inner side with respect to the glass run holding portion, the pair of opposed portions at which the first member and the second member are opposed to each other are formed at the bottom part of the glass run holding portion, and the protruding portion is provided on one of the pair of opposed portions, the protruding portion protruding toward the other opposed portion so as to be laminated and bonded to the other opposed portion by welding. Consequently, the laminated parts of the two members constituting the vehicle door standing pillar sash can be precisely combined and bonded together, thus contributing to improvements in productivity and quality of the vehicle door. Furthermore, the bonded portion formed at the bottom part of the glass run holding portion in the standing pillar sash (laminated parts of the protruding portion and the opposed portion) and the bonded portion formed in the region facing the window opening (laminated parts of the edge portion of the glass run holding portion and the edge portion of the bag-shaped portion) are irradiated with laser light from the window opening side to bond the first member and the second member together by fusion. Consequently, the productivity of the vehicle door can be improved.

The invention claimed is:

1. A method for manufacturing a vehicle door standing pillar sash which comprises a first member and a second member combined together, the first member comprising a glass run holding portion that has a recessed shape opened toward a window opening side, the second member comprising a bag-shaped portion that protrudes toward a vehicle inner side with respect to the glass run holding portion, the method comprising:
    forming a pair of opposed portions at a part of the glass run holding portion so that the pair of opposed portions includes the first member and the second member to oppose each other;
    forming, on one of the pair of opposed portions, a portion protruding toward the other of the pair of opposed portions,
    bonding the protruding portion and the other of the pair of opposed portions together by welding, and forming, on the second member, the protruding portion in shape not to be in contact with a weather strip supported on a rear side of the glass run holding portion;
    forming the first member by roll forming of a metal material;
    forming the second member by press forming; and
    irradiating a bonded portion with laser light from the window opening side to bond the first member and the second member to each other by fusion, and laminating the protruding portion and the other of the pair of opposed portions at the bonded portion.

2. The method for manufacturing the vehicle door standing pillar sash according to claim 1, the method further comprising:
    laminating the protruding portion and the other of the pair of opposed portions on each other at the bonded portion along a direction connecting the vehicle inner side and the vehicle outer side, and bonding the protruding portion and the other of the pair of opposed portions to each other by welding through irradiation of the laser light from the window opening side; and
    laminating, at a position facing the window opening, an edge portion of the glass run holding portion of the first member and an edge portion of the bag-shaped portion of the second member on each other along the direction connecting the vehicle inner side and the vehicle outer side to constitute another bonded portion, and irradiating the other bonded portion with the laser light from the window opening side to bond the first member and the second member to each other by welding.

3. The method for manufacturing the vehicle door standing pillar sash according to claim 2, further comprising
    irradiating the edge portion of the glass run holding portion and the edge portion of the bag-shaped portion with the laser light continuously along a linear region along a longitudinal direction of the standing pillar sash.

4. The method for manufacturing a vehicle door standing pillar sash according to claim 1, wherein the protruding portion includes a plurality of protruding portions, the method further comprising
    forming the protruding portions in different positions in a longitudinal direction of the standing pillar sash.

5. The method for manufacturing a vehicle door standing pillar sash according to claim 1, further comprising
    laminating and bonding the protruding portion at the part of the glass run holding portion and the other of the pair of opposed portions together along a direction connecting the vehicle inner side and a vehicle outer side by welding, and
    laminating and bonding, at a position facing the window opening, an edge portion of the glass run holding portion of the first member and an edge portion of the bag-shaped portion of the second member together along the direction connecting the vehicle inner side and the vehicle outer side by welding.

6. The method for manufacturing a vehicle door standing pillar sash according to claim 1, further comprising
    forming, for the first member, a first design portion on a vehicle outer side, a vehicle inner-side portion on the vehicle inner side, and a first connection portion that connects the first design portion and the vehicle inner-side portion to each other, and forming the glass run holding portion by surrounding the first member by the first design portion, the vehicle inner-side portion, and the first connection portion,
    forming, for the second member, a second design portion on the vehicle outer side with respect to the bag-shaped portion, and a second connection portion that connects the second design portion and the bag-shaped portion to each other, and
    forming the pair of opposed portions in the first member and the second member by the first connection portion and the second connection portion.

7. The method for manufacturing a vehicle door standing pillar sash according to claim 1, wherein;
    the welding is a spiral welding with a laser.

8. The method for manufacturing a vehicle door standing pillar sash according to claim 2, further comprising
    bonding the edge portion of the glass run holding portion of the first member and the edge portion of the bag-shaped portion of the second member together by welding with the laser light.

* * * * *